(12) United States Patent
Malvar

(10) Patent No.: US 7,839,928 B2
(45) Date of Patent: *Nov. 23, 2010

(54) BLOCK TRANSFORM AND QUANTIZATION FOR IMAGE AND VIDEO CODING

(75) Inventor: Henrique S. Malvar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1614 days.

This patent is subject to a terminal disclaimer.

(21) Appl. No.: 11/105,216

(22) Filed: Apr. 12, 2005

(65) Prior Publication Data

US 2005/0180503 A1     Aug. 18, 2005

Related U.S. Application Data

(63) Continuation of application No. 09/955,577, filed on Sep. 18, 2001, now Pat. No. 6,882,685.

(51) Int. Cl.
*H04N 7/12*     (2006.01)
*H04N 11/02*    (2006.01)
*H04N 11/04*    (2006.01)
*H04B 1/66*     (2006.01)

(52) U.S. Cl. .................................................. 375/240.03
(58) Field of Classification Search ....................... None
See application file for complete search history.

(56) References Cited

U.S. PATENT DOCUMENTS

| | | | |
|---|---|---|---|
| 4,922,537 A | 5/1990 | Frederiksen | |
| 5,168,375 A | 12/1992 | Reisch et al. | |
| 5,325,215 A | 6/1994 | Shibata et al. | |
| 5,357,594 A | 10/1994 | Fielder | |
| 5,379,351 A | 1/1995 | Fandrianto et al. | |

(Continued)

FOREIGN PATENT DOCUMENTS

CA          2452343          1/2003

(Continued)

OTHER PUBLICATIONS

Adams et al., "Design of Reversible Subband Transforms Using Lifting," *IEEE*, pp. 489-492 (Aug. 1997).

(Continued)

*Primary Examiner*—Nhon T Diep
(74) *Attorney, Agent, or Firm*—Klarquist Sparkman, LLP

(57) ABSTRACT

An improved method and block transform for image or video encoding and decoding, wherein transformation and inverse transformation matrixes are defined such that computational complexity is significantly reduced when encoding and decoding. For example, in the two-dimensional inverse transformation of de-quantized transform coefficients into output pixel information during decoding, only four additions plus one shift operation are needed, per co-efficient transformation, all in sixteen-bit arithmetic. Transformations provide correct results because quantization during encoding and de-quantization (sixteen bit) during decoding, via the use of one of three tables selected based on each coefficient's position, have parameter values that already compensate for factors of other transformation multiplications, except for those of a power of two, (e.g., two or one-half), which are performed by a shift operation during the transformation and inverse transformation processes. Computational complexity is significantly reduced with respect to other known transforms without adversely impacting compression or quality.

23 Claims, 3 Drawing Sheets

U.S. PATENT DOCUMENTS

| | | | |
|---|---|---|---|
| 5,394,349 | A | 2/1995 | Eddy |
| 5,416,604 | A | 5/1995 | Park |
| 5,430,556 | A | 7/1995 | Ito et al. |
| 5,559,557 | A | 9/1996 | Kato |
| 5,590,066 | A | 12/1996 | Ohki |
| 5,790,441 | A | 8/1998 | Oami et al. |
| 5,844,609 | A | 12/1998 | Filor et al. |
| 5,864,637 | A | 1/1999 | Liu et al. |
| 5,970,173 | A | 10/1999 | Lee et al. |
| 5,995,539 | A | 11/1999 | Miller |
| 5,999,657 | A * | 12/1999 | Yasuhiko .................. 382/248 |
| 6,002,801 | A | 12/1999 | Strongin et al. |
| 6,006,179 | A | 12/1999 | Wu et al. |
| 6,029,126 | A | 2/2000 | Malvar |
| 6,057,855 | A | 5/2000 | Barkans |
| 6,058,215 | A | 5/2000 | Schwartz et al. |
| 6,073,153 | A | 6/2000 | Malvar |
| 6,115,689 | A | 9/2000 | Malvar |
| 6,124,995 | A | 9/2000 | Kim |
| 6,137,916 | A | 10/2000 | Chang et al. |
| 6,154,762 | A | 11/2000 | Malvar |
| 6,301,304 | B1 | 10/2001 | Jing et al. |
| 6,324,560 | B1 | 11/2001 | Malvar |
| 6,356,870 | B1 | 3/2002 | Hui et al. |
| 6,363,117 | B1 | 3/2002 | Kok |
| 6,370,502 | B1 | 4/2002 | Wu et al. |
| 6,389,071 | B1 | 5/2002 | Wilson |
| 6,421,464 | B1 | 7/2002 | Tran et al. |
| 6,473,534 | B1 | 10/2002 | Merhav et al. |
| 6,487,574 | B1 | 11/2002 | Malvar |
| 6,496,795 | B1 | 12/2002 | Malvar |
| 6,507,614 | B1 | 1/2003 | Li |
| 6,600,785 | B1 | 7/2003 | Nishigori et al. |
| 6,606,725 | B1 | 8/2003 | Wang et al. |
| 6,643,408 | B2 * | 11/2003 | Kobayashi .................. 382/250 |
| 6,687,726 | B1 | 2/2004 | Schneider |
| 6,694,342 | B1 | 2/2004 | Mou |
| 6,701,019 | B1 | 3/2004 | Wu et al. |
| 6,728,317 | B1 | 4/2004 | Demos |
| 6,831,951 | B2 | 12/2004 | Yamada |
| 6,882,685 | B2 | 4/2005 | Malvar |
| 6,944,224 | B2 | 9/2005 | Zhao et al. |
| 7,028,063 | B1 | 4/2006 | Sarmaru et al. |
| 7,075,530 | B2 | 7/2006 | D'Amora |
| 7,106,797 | B2 | 9/2006 | Malvar |
| 7,117,053 | B1 | 10/2006 | Absar et al. |
| 7,123,655 | B2 | 10/2006 | Kerofsky |
| 7,194,138 | B1 | 3/2007 | Bright et al. |
| 7,197,525 | B2 | 3/2007 | Stein et al. |
| RE40,081 | E | 2/2008 | Tran et al. |
| 2002/0010577 | A1* | 1/2002 | Matsumoto et al. ......... 704/219 |
| 2002/0013703 | A1 | 1/2002 | Matsumoto et al. |
| 2002/0154693 | A1 | 10/2002 | Demos et al. |
| 2003/0006916 | A1 | 1/2003 | Yakamizawa |
| 2003/0058940 | A1 | 3/2003 | Gunnewiek et al. |
| 2005/0004964 | A1 | 1/2005 | Luo |
| 2005/0013365 | A1 | 1/2005 | Mukerjee et al. |
| 2005/0213659 | A1 | 9/2005 | Malvar |
| 2005/0213835 | A1 | 9/2005 | Guangxi et al. |
| 2006/0133481 | A1 | 6/2006 | Chujoh |
| 2007/0027677 | A1 | 2/2007 | Ouyang et al. |
| 2007/0121729 | A1* | 5/2007 | Chen et al. ............. 375/240.18 |
| 2007/0196025 | A1 | 8/2007 | Tran et al. |
| 2007/0271321 | A1 | 11/2007 | Reznik et al. |

FOREIGN PATENT DOCUMENTS

| | | |
|---|---|---|
| DE | 4133460 A1 | 4/1993 |
| EP | 854653 | 7/1998 |
| JP | 63-219066 | 9/1988 |
| JP | 04-282988 | 10/1992 |
| JP | 06-045948 | 2/1994 |
| JP | 06-045949 | 2/1994 |
| JP | 06-054307 | 2/1994 |
| JP | 09-008665 | 1/1997 |
| JP | 10-091614 | 4/1998 |
| JP | 2003-348598 | 12/2003 |
| WO | WO 01/40985 | 6/2001 |

OTHER PUBLICATIONS

Bruekers et al., "New Networks for Perfect Inversion and Perfect Reconstruction," *IEEE Journal on Selected Areas in Communications*, vol. 10, No. 1, pp. 130-137 (Jan. 1992).

Calderbank et al., "Lossless Image Compression Using Integer to Integer Wavelet Transforms," *IEEE*, 4 pp. (Oct. 1997).

Certificate of Patent dated Jun. 11, 2008, from Korean Patent Application No. 10-2002-54526, 2 pp.

Certificate of Patent dated Jun. 11, 2008, from Korean Patent Application No. 10-2006-94777, 2 pp.

Certificate of Patent dated Jun. 11, 2008, from Korean Patent Application No. 10-2006-94696, 2 pp.

Certificate of Patent dated Jun. 11, 2008, from Korean Patent Application No. 10-2006-94699, 2 pp.

Chan, "The Generalized Lapped Transform (GLT) for Subband Coding Applications," *IEEE*, pp. 1508-1511 (May 1995).

Decision to Grant a Patent dated Apr. 24, 2007, from Japanese Patent Application No. 2002-272,011, 1 p.

Decision to Grant a Patent dated Apr. 24, 2007, from Japanese Patent Application No. 2006-279188, 1 p.

European Search Report dated Feb. 23, 2006, from European Patent Application No. 02019057.5, 8 pp.

Fujiwara, "The Latest MPEG Textbook," pp. 146-147 (1994).

Golston, "Comparing Media Codecs for Video Content," *Embedded Systems Conference*, 18 pp. (Sep. 2004).

Ikehara et al., "Generalized Lapped Biorthogonal Transforms with Integer Coefficients," *IEEE*, pp. 886-890 (Oct. 1998).

Johanson, "SIRAM—Scalable Internet Real-time Media Project Report," 11 pp. (undated).

Karp et al., "Biorthogonal Cosine-Modulated Filter Banks Without DC Leakage," *IEEE*, pp. 1457-1460 (May 1998).

Karp et al., "Efficient Prototype Filter Realizations for Cosine-Modulated Filter Banks," *Seizieme Colloque Gretsi*, pp. 551-554 (Sep. 1997).

Karp et al., "Lifting Schemes for Biorthogonal Modulated Filter Banks," *IEEE*, pp. 443-446 (Jul. 1997).

Loomis et al., "VC-1 Technical Overview," 5 pp. (Apr. 2006).

Malvar, "Biorthogonal and Nonuniform Lapped Transforms for Transform Coding with Reduced Blocking and Ringing Artifacts," *IEEE*, 29 pp. (Oct. 20, 1997).

Malvar, "Lapped Biorthogonal Transforms for Transform Codingwith Reduced Blocking and Ringing Artifacts," *IEEE*, 4 pp. (Apr. 1997).

Malvar, *Signal Processing with Lapped Transforms*, Chapter 5, "Modulated Lapped Transforms," pp. 175-218 (Jan. 1992).

Malvar et al., "The LOT: Transform Coding Without Blocking Effects," *IEEE Transactions on Acoustics, Speech, and Signal Processing*, vol. 37, No. 4, pp. 553-559 (Apr. 1989).

Nguyen et al., "Structures for M-Channel Perfect-Reconstruction FIR QMF Banks Which Yield Linear-Phase Analysis Filters," *IEEE Transactions on Acoustics, Speech, and Signal Processing*, vol. 38, No. 3, pp. 433-446 (Mar. 1990).

Notice of Preliminary Rejection dated Oct. 18, 2007, from Korean Patent Application No. 10-2002-54526, 5 pp.

Notice of Preliminary Rejection dated Oct. 18, 2007, from Korean Patent Application No. 10-2006-94777, 4 pp.

Notice of Preliminary Rejection dated Oct. 18, 2007, from Korean Patent Application No. 10-2006-94696, 4 pp.

Notice of Preliminary Rejection dated Oct. 18, 2007, from Korean Patent Application No. 10-2006-94699, 4 pp.

Notice on Grant of Patent dated Aug. 26, 2005, from Chinese Patent Application No. 02143205.8, 4 pp.

Notice on Grant of Patent dated Oct. 10, 2008, from Chinese Patent Application No. 200510119221.1, 4 pp.

Notice on Grant of Patent dated Dec. 5, 2008, from Chinese Patent Application No. 200510119220.7, 4 pp.
Notice on First Office Action dated Feb. 1, 2008, from Chinese Patent Application No. 200510119219.4, 8 pp.
Notice on First Office Action dated Feb. 1, 2008, from Chinese Patent Application No. 200510119220.7, 7 pp.
Notice on First Office Action dated Feb. 1, 2008, from Chinese Patent Application No. 200510119221.1, 7 pp.
Notice on Office Action dated Jan. 7, 2005, from Chinese Patent Application No. 02143205.8, 9 pp.
Official Notice of Rejection dated Dec. 15, 2006, from Japanese Patent Application No. 2002-272,011, 9 pp.
Official Notice of Rejection dated Dec. 15, 2006, from Japanese Patent Application No. 2006-279188, 9 pp.
Official Notice of Rejection dated Jun. 24, 2008, from Japanese Patent Application No. 2006-279187, 9 pp.
Official Notice of Rejection dated Jun. 24, 2008, from Japanese Patent Application No. 2006-279189, 11 pp.
Official Notice of Rejection dated Jun. 24, 2008, from Japanese Patent Application No. 2006-322322, 9 pp.
Oraintara et al., "Integer Fast Fourier Transform," *IEEE Trans. on Signal Processing*, vol. 50, No. 3, pp. 607-618 (Mar. 2002).
Partial European Search Report dated Oct. 18, 2005, from European Patent Application No. 02019057.5, 6 pp.
Second Office Action dated Aug. 15, 2008, from Chinese Patent Application No. 200510119219.4, 8 pp.
Sweldens, "The Lifting Scheme: A Custom-Design Construction of Biorthogonal Wavelets," 29 pp. (Nov. 1994).
Tian et al., "Dyadic Rational Biorthogonal Coifman Wavelet Systems," Technical Report CML TR 96-07, 50 pp. (Feb. 27, 1996).
Topiwala, "FastVDO Unified 16-Bit Framework," FastVDO LLC Powerpoint Presentation, 26 pp. (Jan. 2002).
Tran et al., "The Generalized Lapped Biorthogonal Transform," *IEEE*, pp. 1441-1444 (May 1998).
Tran, "The LIFTLT: Fast Lapped Transforms Via Lifting Steps," *IEEE*, vol. 2, pp. 745-748 (Oct. 1999).
Tran, "The LIFTLT: Fast Lapped Transforms via Lifting Steps," *IEEE Transactions on Signal Processing Letters*, vol. 7, Issue 6, pp. 145-148 (Jun. 2000).
U.S. Appl. No. 60/488,710, filed Jul. 18, 2003, Srinivasan et al.
U.S. Appl. No. 60/501,081, filed Sep. 7, 2003, Srinivasan et al.
U.S. Appl. No. 60/501,133, filed Sep. 7, 2003, Holcomb et al.
Hohl, "An 8×8 Discrete Cosine Transform Implementation on the TMS320C25 or the TMS320C30," *Texas Instruments Application Report SPRA115*, pp. 1-25 (1990) http://focus.ti.com/lit/an/spra115/spra115.pdf [Downloaded from the World Wide Web on Dec. 28, 2005].
Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].
Mook, "Next-Gen Windows Media Player Leaks to the Web," *BetaNews*, 18 pp. (Jul. 19, 2002) [Dowloaded from the World Wide Web on Mar. 16, 2004].
Shao, "Implementing JPEG with TMS320C2xx Assembly Language Software," *Texas Instruments Application Report SPRA615*, pp. 1-48 (Jan. 2000) http://focus.ti.com/lit/an/spra615/spra615.pdf [Downloaded from the World Wide Web on Dec. 28, 2005].
Sullivan et al., "The H.264/AVC Advanced Video Coding Standard: Overview and Introduction to the Fidelity Range Extensions," 21 pp. (Aug. 2004).
Ishii et al., "Parallel Variable Length Decoding with Inverse Quantization for Software MPEG-2 Decoders," Signal Processing Systems 1997, IEEE, pp. 500-509 (1997).
Jeong et al., "A Fast Algorithm Suitable for DCT Implementation with Integer Multiplication," TENCON '96, vol. 2, IEEE, pp. 784-787 (1996).
Liang et al., "Approximating the DCT with the Lifting Scheme: Systematic Design and Applications," Conference Record of the 34th Asilomar Conference, vol. 1, IEEE, pp. 192-196 (Oct. 2000).
Malvar, "Low-complexity Length-4 Transform and Quantization with 16-bit Arithmetic," Proposal, ITU Study Group 16 Question 6, Video Coding Experts Group, 14th meeting held Sep. 24-27, 2001 in Santa Barbera, CA, 24 pp.

Pei et al., "The Integer Transforms Analogous to Discrete Trigonometric Transforms," IEEE Transactions on Signal Processing, vol. 48, No. 12, pp. 3345-3364 (Dec. 2000).
Sriram et al., "MPEG-2 Video decoding on the TMS320C6X DSP Architecture," Conference Record of the 32nd Asilomar Conference, vol. 2, IEEE, pp. 1735-1739 (1998).
Trac D. Tran, "The BinDCT: Fast Multiplierless Approximation of the DCT," IEEE Signal Processing Letters, vol. 7, No. 6, pp. 141-144 (Jun. 2000).
Wien, "Variable Block-Size Transforms for Hybrid Video Coding," Dissertation, 182 pp. (Feb. 2004).
Bjontegaard, "H.26L Test Model Long Term No. 8 (TML-8) Draft 0," *Video Coding Experts Group (VCEG )*, pp. 1-46.
Calderbank et al., "Wavelet Transforms that Map Integers to Integers," pp. 1-39 (Aug. 1996).
Cham, "Development of Integer Cosine Transforms by the Principle of Dyadic Symmetry," *IEE Proceedings*, vol. 136, Pt. 1, No. 4, pp. 276-282 (Aug. 1989).
Liang et al., "A 16-bit Architecture for H.26L, Treating DCT Transforms and Quantization," *Thirteenth Meeting: Austin, Texas, USA*, pp. 1-17 (Apr. 2001).
U.S. Appl. No. 60/341,674, filed Dec. 17, 2001, Lee et al.
Liang et al., "Fast Multiplierless Approximation of the DCT with the Lifting Scheme," *Proc. SPIE Apps. of Digital Image Procesing XXIII*, 12 pp. (Aug. 2000).
Reader, "History of MPEG Video Compression—Ver. 4.0," 99 pp., document marked Dec. 16, 2003.
ISO/IEC, "ISO/IEC 11172-2, Information technology—Coding of moving pictures and associated audio for digital storage media at up to about 1,5 Mbit/s—Part 2: Video," 112 pp. (1993).
ISO/IEC, "JTC1/SC29/WG11 N2202, Information Technology—Coding of Audio-Visual Objects: Visual, ISO/IEC 14496-2," 329 pp. (1998).
ITU-T, "ITU-T Recommendation H.261, Video Codec for Audiovisual Services at p ×64 kbits," 25 pp. (1993).
ITU-T, "ITU-T Recommendation H.262, Information Technology—Generic Coding of Moving Pictures and Associated Audio Information: Video," 205 pp. (1995).
ITU-T, "ITU-T Recommendation H.263, Video coding for low bit rate communication," 162 pp. (1998).
Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).
Printouts of FTP directories from http://ftp3.itu.ch , 8 pp. (downloaded from the World Wide Web on Sep. 20, 2005.).
Li et al., "On Implementing Transforms from Integers to Integers," *Department of Electrical Engineering, Princeton University*, pp. 881-885, Jun. 1998.
Rubino et al., "Improved Chen-Smith Image Coder," *Electrical Engineering Department, Iniversity of Texas at Arlington*, pp. 267-270, 1993.
J. W. Cooley and J. W. Tukey, "An algorithm for the machine calculation of complex Fourier series," *Math. Computation*, vol. 19, pp. 297-301, 1965.
W. Chen, C. H. Smith, and S. C. Fralick, "A fast computational algorithm for the discrete cosine transform," *IEEE Trans. Commun.*, vol. 25, pp. 1004-1009, Sep. 1977.
H. Malvar, "Fast computation of the discrete cosine transform and the discrete Hartley transform," *IEEE Trans. Acoust., Speech, Signal Processing*, vol. ASSP-35, pp. 1484-1485, Oct. 1987.
C. Loeffler et al., "Practical fast 1-D DCT algorithms with 11 multiplications," *Proc. IEEE ICASSP*, vol. 2, pp. 988-991, Feb. 1989.
Arai, et al., "A Fast DCT-SQ Scheme for Images," the Transactions of the IEICE, vol. E 71, No. 11, Nov. 1988, pp. 1095-1097.
Official Notice of Final Rejection dated Apr. 21, 2009, from Japanese Patent Application No. 2006-279187, 5 pp.
Official Notice of Final Rejection dated Apr. 21, 2009, from Japanese Patent Application No. 2006-279189, 5 pp.
Official Notice of Final Rejection dated Apr. 21, 2009, from Japanese Patent Application No. 2006-322322, 6 pp.

ITU-T, "ITU-T Recommendation H.262, Information Technology—Generic Coding of Moving Pictures and Associated Audio Information: Video," pp. 55-57, 71-73, (1995).

Non-final Office action mailed Nov. 12, 2009, from related U.S. Appl. No. 11/104,956.

Non-final Office action mailed Mar. 3, 2009, from related U.S. Appl. No. 11/104,956.

Non-final Office action mailed Nov. 27, 2009, from related U.S. Appl. No. 11/067,101.

Non-final Office action mailed Mar. 4, 2009, from related U.S. Appl. No. 11/067,101.

* cited by examiner

BLOCK TRANSFORM AND QUANTIZATION FOR IMAGE AND VIDEO CODING

RELATED APPLICATION DATA

This application is a continuation of U.S. patent application Ser. No. 09/955,577, filed Sep. 18, 2001, which is incorporated herein by reference.

FIELD OF THE INVENTION

The invention relates generally to the encoding and decoding of image and video signals, and more particularly to an improved block transform and inverse transform, along with quantization and de-quantization methods, for encoding and decoding image video signals.

BACKGROUND OF THE INVENTION

The Discrete Cosine Transform (DCT) is commonly used in block transform image and video (sequences of images) coding, e.g., JPEG and MPEG. Among other reasons, this is because the DCT separates random signals (such as corresponding to image data) into low frequency parts of greater importance and high frequency parts of lesser importance with respect to the image's visual quality, thus facilitating compression.

By way of example, H.26L is an image and/or video codec technology that constructs frames using four-by-four blocks of pixels. Unlike MPEG and JPEG, which uses eight-by-eight blocks, H.26L obtains relatively high-quality compression with four-by-four blocks of pixels by using prediction information of existing other blocks in the same frame, (i.e., intra-frame coding), in addition to estimation and motion compensation between frames, (i.e., inter-frame coding). In general, to accomplish intra-frame prediction, an H.26L encoder tells the corresponding H.26L decoder what other, previous block of pixels in the frame being built is being used as a basis for the prediction, along with identifying which one of six possible predictors (formulas) to use in determining the pixels for the new block (from those of the previous intra-frame block). This leads to a prediction error, which is also provided to the decoder to correct the new block. The prediction error information is encoded with the block transform (DCT) and sent encoded to the decoder, for re-computing the error information, including via an inverse transform, to correct the predicted block.

Image and video encoding or decoding takes a significant amount of processing power. As is known, an encoder typically has far more processing power than do many of the decoders that convert the data to images, as decoders are typically implemented in consumer devices. For example, image and video decoding may take place in television set-top boxes, personal digital assistants (PDAs), pocket-sized personal computers, and more advanced cellular telephones.

Thus, when considering image and video encoding and decoding methods, keeping the decoding simple is important, even if it means that encoding has to be made more computationally complex. Anything that can simplify decoding is desirable, provided that in doing so, the encoding and decoding processes do not adversely impact existing levels of compression, final image quality and the amount of other resources needed at the decoder in any substantial way relative to existing technology.

SUMMARY OF THE INVENTION

Briefly, the present invention provides an improved method, system and block transform that significantly simplifies computational complexity for images and video at both the encoder and decoder. At the same time, compression, image/video quality, and other resources are only negligibly affected.

More particularly, an orthogonal block transform and corresponding inverse transform with new integer approximations to the Discrete Cosine Transform (DCT) are provided, along with other computing changes that significantly reduce computational complexity at both the encoder and decoder. Indeed, in one implementation, at the encoder and decoder, the number of transform operations, per coefficient, has been reduced to four additions and one shift in 16-bit arithmetic, (from four additions and three multiplications in 32-bit arithmetic required with the H.26L-specified transform). The present invention correctly transforms the pixel information (e.g., error correction data) because quantization (scaling and rounding to an integer) during encoding, and de-quantization during decoding, via the use of one of three tables selected based on each coefficient's position, have parameter values that already compensate for factors of other transformation multiplications, except for the one performed by the shift operation during the transformation and inverse transformation processes.

Further, during decoding, on each quantized coefficient, the decoder can perform a sixteen-bit multiplication to de-quantize that quantized coefficient into a transform coefficient, instead of a thirty-two bit multiplication (as required in H.26L). On many devices, with typical images and video, the processing benefits of the present invention are thus significant relative to H.26L, especially at the decoder, with only negligible if any loss in quality and/or compression.

Other benefits and advantages will become apparent from the following detailed description when taken in conjunction with the drawings, in which:

DETAILED DESCRIPTION

Exemplary Operating Environment

Figure 1:
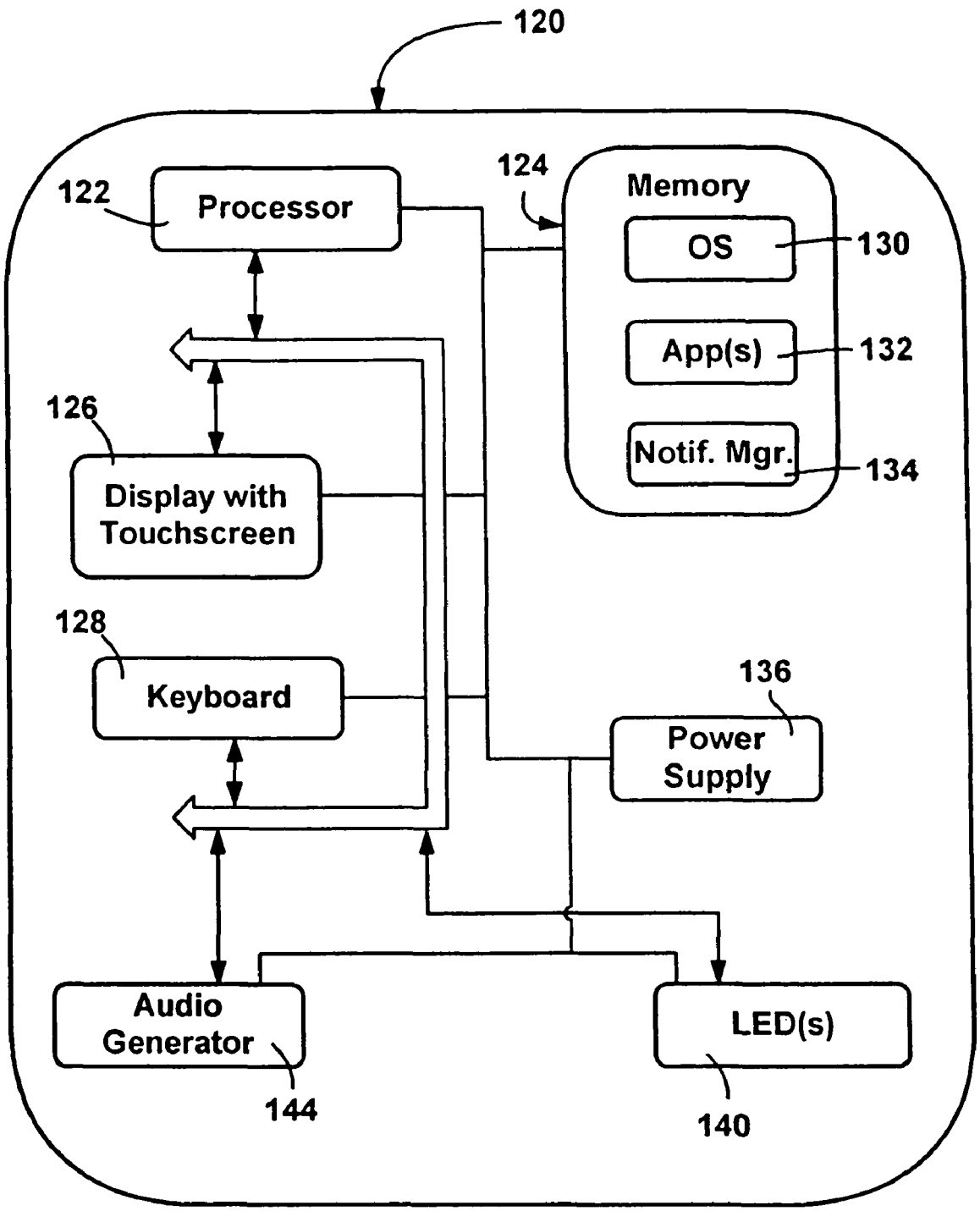
FIG. 1 is a block diagram representing an exemplary computer system into which the present invention may be incorporated.

FIG. 1 illustrates an example of a suitable operating environment 120 in which the invention may be implemented, particularly for decoding image and/or video data. The operating environment 120 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. For example, it is likely that encoding image and/or video image data often will be performed on a computer with more processing power than contemporary hand-held personal computers, but there is no reason encoding cannot be performed on the exemplary device, or decoding on a more powerful machine.

The invention may be described in the general context of computer-executable instructions, such as program modules, executed by one or more computers or other devices. Generally, program modules include routines, programs, objects, components, data structures and so forth that perform particular tasks or implement particular abstract data types. Typically the functionality of the program modules may be combined or distributed as desired in various embodiments. Computing device 120 typically includes at least some form of computer readable media. Computer-readable media can be any available media that can be accessed by the computing device 120. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 120. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

FIG. 1 shows functional components of one such handheld computing device 120, including a processor 122, a memory 124, a display 126, and a keyboard 128 (which may be a physical or virtual keyboard). The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® CE operating system from Microsoft® Corporation, or another operating system.

One or more application programs 132 are loaded into memory 124 and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132.

The handheld personal computer 120 has a power supply 136, which is implemented as one or more batteries. The power supply 136 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 140 and an audio generator 144. These devices may be directly coupled to the power supply 136 so that when activated, they remain on for a duration dictated by a notification mechanism even though the handheld personal computer processor 122 and other components might shut down to conserve battery power. The LED 140 preferably remains on indefinitely until the user takes action. Note that contemporary versions of the audio generator 144 use too much power for today's handheld personal computer batteries, and so it is configured to turn off when the rest of the system does or at some finite duration after activation.

Encoding and Decoding

By way of background, the Discrete Cosine Transform (DCT) maps a length-N vector x into a new vector X of transform coefficients by a linear transformation X=Hx, where the element in the kth row and nth column of H is defined by $$H_{kn} = H(k,n) = c_k \sqrt{\frac{2}{N}} \cos\left((n+1/2)\frac{k\pi}{N}\right)$$

for k=0, 1, ..., N−1, and n=0, 1, ..., N−1, with $c_0=\sqrt{2}$ and $c_k=1$ for k>1. The DCT matrix is orthogonal, so its inverse equals its transpose, that is $x=H^{-1}X=H^TX$.

One disadvantage of the DCT is that the entries H(k,n) are irrational numbers, and so integer input data x(n) will map to irrational transform coefficients X(k). As a result, with digital computers, when the direct and inverse transforms are computed in cascade, the output data does not exactly equal the input data. In other words, if computed as X=Hx, and u=round($H^TX$), then it is not true that u(n)=x(n) for all n. However, by introducing appropriate scale factors α, γ, e.g., X=γHx and u=round($\alpha H^TX$), then u(n)=Gx(n), where G is an integer, for almost all n, when α and γ are chosen to be large enough, but this does not guarantee an exact result.

In a motion-compensated video encoder, for example, the data of past decoded frames are used as reference information for prediction information that will be used to generate the current frame. Therefore, as part of encoding, the encoder generates its own decoded frames, whereby the encoder needs to compute inverse transforms. If the formula u=round ($\alpha H^TX$) is used, then different floating-point formats and rounding strategies in different processors lead to different results. As a result, there will be a drift between the decoded data at the encoder versus that decoded by decoders (which have different processors), whereby the image worsens more and more per each new frame, since the encoder is basing prediction/motion information on frames of blocks that are increasingly less and less like the frames of blocks that the decoder is producing.

One solution to the data drift problem approximates the matrix H by a matrix containing only integers, whereby rounding errors are eliminated. If the rows of H are orthogonal and have the same norm (sum of the squares), then it follows that u can be computed exactly in integer arithmetic for all integer x. In other words, when the direct transform is computed by X=Hx and the inverse transform by u=$H^T$X, then u=Gx results, where G is an integer equal to the squared norm of any of the rows in H.

One way to generate integer approximations to the DCT is by using the general formula:

$$Q(k,n) = \text{round}(\alpha H(k,n))$$

where $\alpha$ is a scaling parameter.

In the H.26L video compression standard, the image is made up of blocks of four pixels by four pixels, whereby N=4 in the DCT formula in H.26L. This results in the DCT matrix equaling:

$$H = \frac{1}{2}\begin{bmatrix} 1 & 1 & 1 & 1 \\ c & s & -s & -c \\ 1 & -1 & -1 & 1 \\ s & -c & c & -s \end{bmatrix}$$

where $c \triangleq \sqrt{2} \cos(\pi/8)$ and $s \triangleq \sqrt{2} \sin(\pi/8)$.

The transform matrix in the current version of H.26L is obtained by setting $\alpha=26$, whereby the values compute to:

$$Q_0 = \text{round}(26H) = \begin{bmatrix} 13 & 13 & 13 & 13 \\ 17 & 7 & -7 & -17 \\ 13 & -13 & -13 & 13 \\ 7 & -17 & 17 & -7 \end{bmatrix}$$

With a scaling parameter value of 26, the rows and columns of $Q_0$ are orthogonal to each other (i.e., the inner product of any two columns is zero), and all rows and columns have a norm equal to 676. In fact, for values wherein $\alpha<50$, only $\alpha=2$ or $\alpha=26$ provide orthogonal matrices with equal norm rows. However, the solution for $\alpha=2$ does not lead to good compression, and larger values for $\alpha$ are not attractive because of the increase in the computational complexity (e.g., word length) required to compute the results of the direct transform X=$Q_0$x. Hence, $\alpha=26$ has been heretofore chosen in H.26L.

The inverse transform is defined by x'=$Q_0$X, so that it can also be computed with integer arithmetic. From the definition above, x'=676x, i.e. the reconstructed data x' is equal to the original data x amplified by an integer gain of 676 (which is the norm of any of the rows in $Q_0$).

In accordance with one aspect of the present invention, a block transform matrix is provided that uses integer approximations that are orthogonal, yet have different values that significantly reduce computational complexity when encoding and decoding. More particularly, using $\alpha=2.5$, the following matrix is generated:

$$Q_D \triangleq \text{round}(2.5H) = \begin{bmatrix} 1 & 1 & 1 & 1 \\ 2 & 1 & -1 & -2 \\ 1 & -1 & -1 & 1 \\ 1 & -2 & 2 & -1 \end{bmatrix}$$

Note that the rows of $Q_D$ are orthogonal to each other, and, while their norms are different (rows zero and two have norms equal to four, while rows one and three have norms equal to ten), as described below this is handled in quantization and de-quantization in a manner that does not significantly increase computational complexity.

Figure 2:
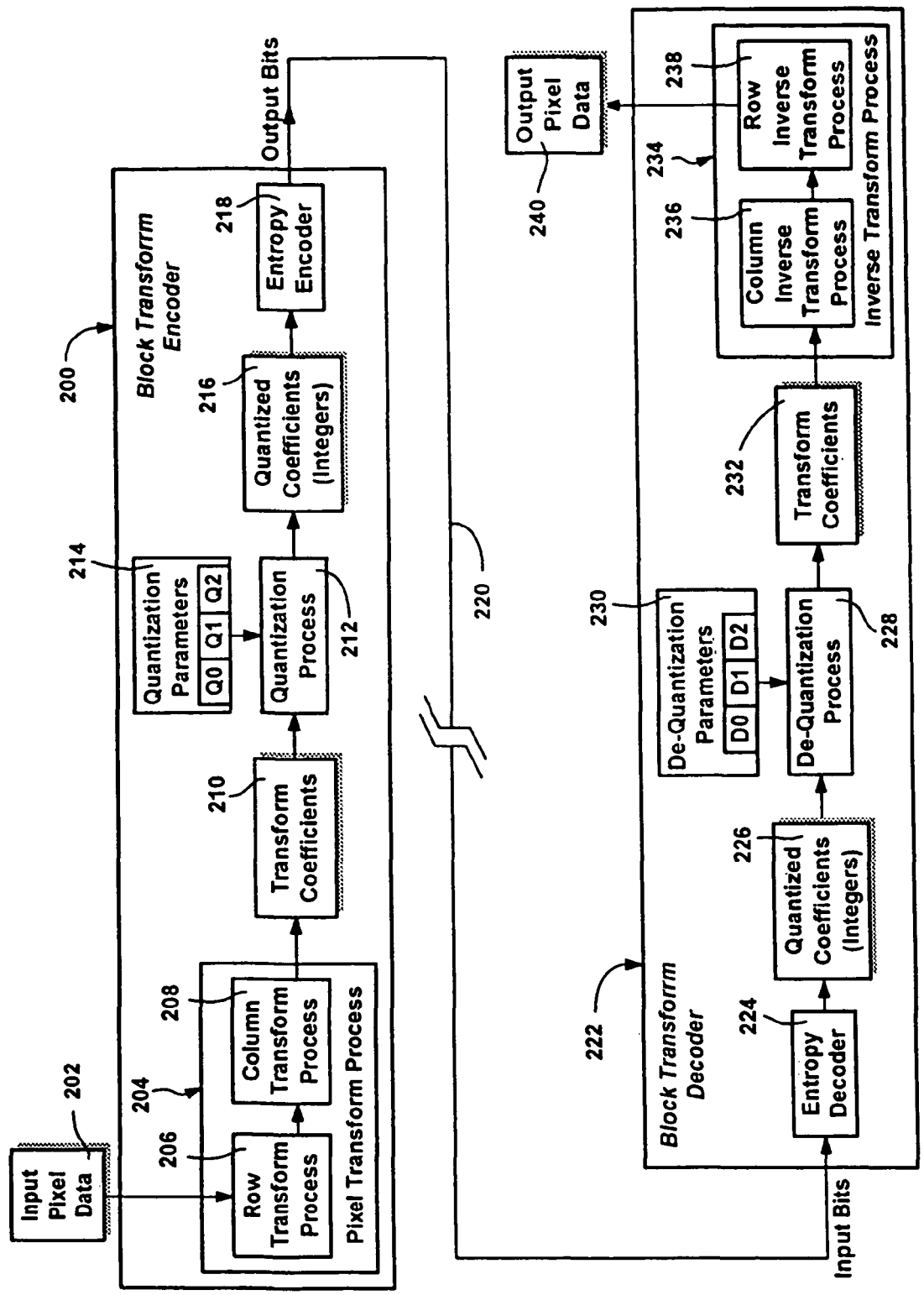
FIG. 2 is a block diagram representing components used in encoding pixels of video or image data into encoded video, and decoding the encoded video into pixel information, including transformation, quantization, de-quantization and inverse transformation in accordance with one aspect of the present invention.

Turning to FIG. 2 of the drawings, there is shown a block transform encoder 200 and block transform decoder 222, connectable via by some type of medium and/or intermediate devices 220. As is understood, an encoder 200 need not make its output directly available to the decoder 222, and thus the line labeled 220 in FIG. 2 may represent virtually any type of medium or devices, such as a network cable, wireless transmission medium, telephone line, storage device, router, and/or virtually any combination thereof.

In general, the encoder 200 operates by transforming each block of N×N input pixel data 202 (e.g., representing error correction information) via a separable two-dimensional transforms 204. More particularly, first the rows of pixel data within the block are transformed by a row transformation process 206, and then the results of the row transformation (not specifically represented in FIG. 2) are transformed by a column transformation process 208 into the resulting transform coefficients 210. In other words, the two-dimensional DCT essentially performs a one-dimensional DCT on each row of a block of pixels, followed by a one-dimensional DCT on each column of the block of pixels that was produced by the one-dimensional DCTs on the rows. The row and column transformations can be performed in reversed order, with the same result obtained.

In H.26L, the specified transform matrix results in the following formulas for computing the transform coefficients:

A=13a+13b+13c+13d

B=17a+7b−7c−17d

C=13a−13b−13c+13d

D=7a−17b+17c−7d where [abcd] first represents a row of pixel values, and then, after row transformation, represents a column of those row-transformed data values, in a four-by-four block. However, in practice, these formulas can be simplified, and the DCT matrix has a recursive structure that reduces the number of required multiplication and addition operations. Nevertheless, the above matrix requires at least four additions and three multiplications to compute the transform coefficients for each pixel. Moreover, because each pixel may be a signed nine-bit value, when multiplied by the row and column factors (the gain equals the norm of 676) the computation requires 32-bit arithmetic, in which a single computation takes as much time as many 16-bit computations. While these considerations are not normally as significant during encoding, with these H.26L specified matrix values, the extra operations and 32-bit arithmetic also occur during decoding, wherein the expense is significant.

In contrast to the H.26L-specified matrix, using the same general formula representation, as described above the present invention's block transform matrix is:

$$Q_D \triangleq \text{round}(2.5H) = \begin{bmatrix} 1 & 1 & 1 & 1 \\ 2 & 1 & -1 & -2 \\ 1 & -1 & -1 & 1 \\ 1 & -2 & 2 & -1 \end{bmatrix}$$

which provides the following formulas for computing the transform coefficients:

$A = a+b+c+d$ $B = 2a+b-c-2d$ $C = a-b-c+d$ $D = a-2b+2c-d$

Part of the reason that this formula/matrix works more optimally is that instead of performing individual multiplications in the transformation stage, the multiplication factors are essentially handled in the quantization phase, by simply changing the values used in scaling. As a result, the only multiplication with these formulas is by a power of two, which in processors is accomplished via a simple shift left operation, not an actual multiplication. With u, v, y and z used as auxiliary variables, and wherein "<<1" means shift left one bit (equivalent to multiplying by two but computationally faster), the above formulas simplify to the following formulas:

$u = a+d;$ $v = b+c;$ $y = b-c;$ $z = a-d;$ $A = u+v;$ $C = u-v;$ $B = y+(z<<1);$ $D = z-(y<<1);$

Figure 3:
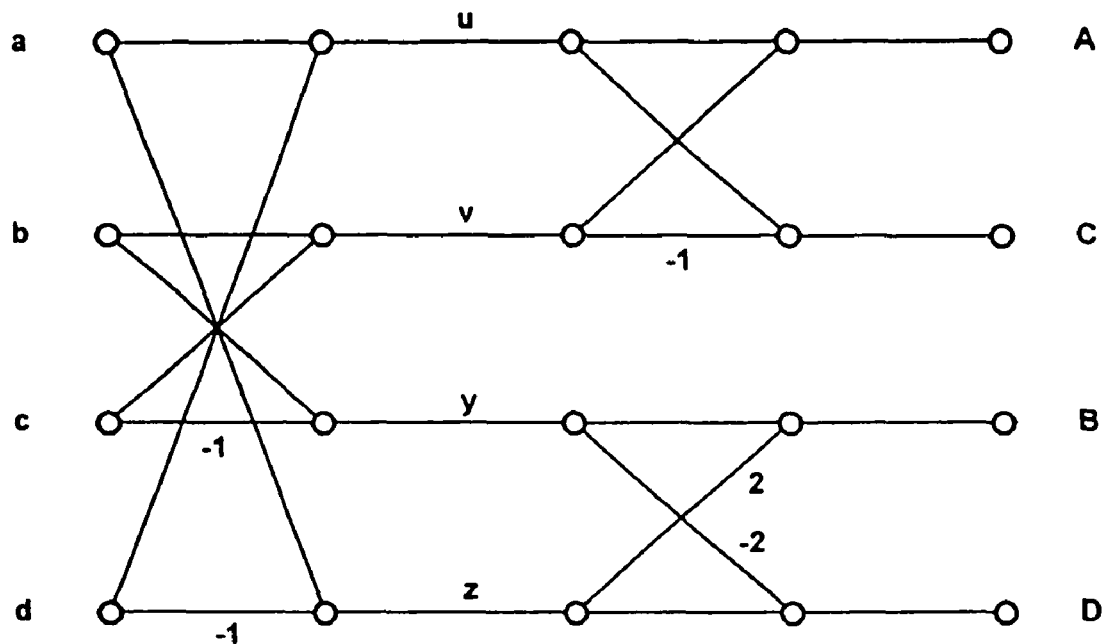
FIG. 3 is a representation of a butterfly structure that represents the improved transformation matrix in accordance with one aspect of the present invention.

Via the butterfly structure represented in FIG. 3, (wherein a line between two points indicates a sum, and the numbers on the lines (the −1s, 2 and −2 indicate a multiplication factor) finding these transform coefficients actually requires only four additions and one shift for each given pixel, providing a very substantial performance improvement relative to the H.26L-specified factors. Moreover, because of the lower coefficient values, all transformation operations may be performed in 16-bit arithmetic (with 9-bit pixel data). More particularly, with the transform matrix $Q_D$ defined above, after a two-dimensional 2-D transform, the maximum signal amplification is 36, whereby the output coefficients after the two-dimensional transform will span 6 more bits than the input. Therefore, for 9-bit input, the output coefficients have a dynamic range of 15 bits, meaning that the two-dimensional direct transform can be computed with 16-bit arithmetic. Moreover, as described below, the performance increase resulting from far fewer operations, each of which requires only 16-bit arithmetic, is essentially repeated during decoding operations with the inverse transform, providing a significant increase in decoding performance.

Once the transform coefficients 210 are computed, the block of coefficients 210 is quantized by scaling the values and rounding them to their nearest integers. This is represented in FIG. 2 by the quantization process 212, which selects from among quantization values from quantization parameters 214 to scale the transform coefficients 210 into quantized coefficients 216. As described above, because there is not one norm, but three in the improved matrix, three quantization tables Q0, Q1 and Q2 contain these values, depending on where the transformed coefficient to be quantized is positioned in the block.

The quantization formula for scaling and rounding is as follows, which should be computed with 32-bit precision:

$L = [K \times A(QP,r) + fX] >> 20$ where L is the quantized coefficient, K is the transformed coefficient, A(QP,r) is the scale factor indexed by the quantization parameter QP and r, wherein r identifies which table (Q0, Q1 or Q2 to use), fX is in the range [0-0.5]×$2^{20}$ (fX has the same sign as K), and >>20 means shift right twenty places (divide by 1,048,576), to scale the number down. The quantization process thus introduces errors. Note that although 32-bit arithmetic is used for quantization, this is only required when encoding, which is not as significant as when decoding (wherein de-quantization needs only 16-bit precision, as described below).

The index r thus selects which of the three quantization tables Q0, Q1 or Q2 to use to adjust for the three different norms, based on the position of the coefficient K in the block:

r=0 (use Q0) if the coefficient came from one of the positions {(0,0), (0,1), (1,0), (1,1)};

r=1 (use Q1) if the coefficient came from one of the positions {(0,2), (0,3), (1,2), (1,3), (2,0), (2,1), (3,0), (3,1)};

r=2 (use Q2) if the coefficient came from one of the positions {(2,2), (2,3), (3,2), (3,3)}.

After the right shift by 20 bits, each quantized result L fits into a 16-bit integer.

In an exemplary implementation, the scaling factor A(QP, r) depends on the quantization parameter QP and coefficient position group r according to the following tables:

A(QP=0 . . . 31, r=0)={104858, 93418, 83226, 74146, 66056, 58849, 52429, 46709, 41613, 37073, 33028, 29425, 26214, 23354, 20806, 18536, 16514, 14712, 13107, 11677, 10403, 9268, 8257, 7356, 6554, 5839, 5202, 4634, 4129, 3678, 3277, 2919};

A(QP=0 . . . 31, r=1)={66318, 59082, 52636, 46894, 41778, 37220, 33159, 29541, 26318, 23447, 20889, 18610, 16579, 14771, 13159, 11723, 10444, 9305, 8290, 7385, 6580, 5862, 5222, 4652, 4145, 3693, 3290, 2931, 2611, 2326, 2072, 1846};

A(QP=0 . . . 31, r=2)={41943, 37367, 33290, 29658, 26422, 23540, 20972, 18684, 16645, 14829, 13211, 11770, 10486, 9342, 8323, 7415, 6606, 5885, 5243, 4671, 4161, 3707, 3303, 2942, 2621, 2335, 2081, 1854, 1651, 1471, 1311, 1168}.

The particular values above were designed to satisfy the design specification in H.26L that the quantization step sizes should double for every increment of six in the table index. For other video or still image coding applications, other quantization tables can be designed, in view of the desired fidelity increments. Note that to store the quantization tables at the encoder, some extra table space is needed to store three tables instead of one, but this amount of extra space is only 64 bytes, which is negligible.

Returning to FIG. 2, following the quantization process, the quantized coefficients 216 are fed to an entropy encoder 218 which, in general, further reduces the number of bits needed to encode the block. Entropy encoders (and decoders) are known, and are thus not described herein, as the present invention operates before and essentially independent of entropy encoding, and after and essentially independent of entropy decoding.

Turning to a consideration of decoding in the block transform decoder 222, at some time, regardless of how delivered, the entropy encoded output bits are fed as input bits to an entropy decoder 224. In general, such entropy decoders are known, and thus among other possible operations, it suffices to state that the entropy encoder 224 reproduces the quantized coefficients 226 for a given block. Note that typically the encoding and decoding are not lossy, i.e., the quantized coefficients 216 fed into the entropy encoder 218 will be identical to the quantized coefficients 226 produced by entropy decoder 224.

In general, the block transform decoder 222 mirrors the operation of the block transform encoder 200, although as described below and in keeping with the present invention, a modified inverse transform matrix is provided that enables 16-bit arithmetic to be used throughout the decoding process, thus greatly simplifying the decoder's computational complexity.

Once the quantized coefficients 226 are retrieved from the entropy decoder 224, each quantized coefficient L is converted to a reconstructed (de-quantized) value K' by a de-quantization process 228 implementing the formula:

$$K' = L \times B(QP, r)$$

where the scaling factor B depends on the QP index used when encoding, and r determines the de-quantization parameters 230 by selecting a parameter from one of the tables D0, D1, or D2 (to adjust for the three norms). Note that r can be deduced from the position of the coefficient being de-quantized in the block, as described above with respect to quantization, although it is feasible to send the r value from the encoder, which would possibly reduce computational complexity on the decoder but would require at least two more bits be sent per coefficient to identify r.

In this manner, the scaling factor B(QP, r) depends on the quantization parameter index for QP used when encoding, and the coefficient position group r. In an exemplary implementation, that dependency is specified according to the following tables:

B(QP=0 . . . 31, r=0)={80, 90, 101, 113, 127, 143, 160, 180, 202, 226, 254, 285, 320, 359, 403, 453, 508, 570, 640, 718, 806, 905, 1016, 1140, 1280, 1437, 1613, 1810, 2032, 2281, 2560, 2874};

B(QP=0 . . . 31, r=1)={101, 114, 127, 143, 161, 180, 202, 227, 255, 286, 321, 361, 405, 454, 510, 572, 643, 721, 810, 909, 1020, 1145, 1285, 1443, 1619, 1817, 2040, 2290, 2570, 2885, 3239, 3635};

B(QP=0 . . . 31, r=2)={128, 144, 161, 181, 203, 228, 256, 287, 323, 362, 406, 456, 512, 575, 645, 724, 813, 912, 1024, 1149, 1290, 1448, 1625, 1825, 2048, 2299, 2580, 2896, 3252, 3650, 4095, 4596}.

As with the encoding tables, the particular values above were designed to satisfy the design specification in H.26L that the quantization step sizes should double for every increment of six in the table index. For other video or still image coding applications, other quantization tables can be designed, in view of the desired fidelity increments.

As can be appreciated, the de-quantization formula scales the coefficients back up to larger values, although each of these scaling values is low enough to ensure that only 16-bit arithmetic is needed at the decoder. It should be noted that since each entry in a table is mathematically related (based on the norm) to corresponding QP-indexed table entries in the other two tables, it is alternatively possible have only one table of QP values, with an appropriate mathematical adjustment based on the r value, rather than have three tables. However, lookups in small tables are relatively efficient, and the number of bytes required to store three tables of thirty-two entries at two bytes per entry instead of one table of thirty-two entries at four bits per entry (required with the specified H.26L transform) is sixty-four extra bytes, which is negligible in contemporary computing devices, especially considering that the transform coefficients generated by de-quantization fit into sixteen bit words instead of 32-bit DWords, thereby reducing the total amount of memory needed.

As also represented in FIG. 2, once the quantized coefficients 226 have been de-quantized via the above formula and tables, a four-by-four matrix of reconstructed transform coefficients 232 is present. From those transform coefficients 232, the reconstructed pixels are generated by feeding them to a two-dimensional inverse transform process 234 comprising column and row inverse transform processes 238 and 238, respectively.

In keeping with the present invention, instead of using the inverse transform $Q_I = Q_D^T$, as would normally be done, to allow for 16-bit de-quantization and inverse transform computation, the present invention defines the following inverse transform matrix for use:

$$Q_I \triangleq \begin{bmatrix} 1 & 1 & 1 & 1/2 \\ 1 & 1/2 & -1 & -1 \\ 1 & -1/2 & -1 & 1 \\ 1 & -1 & 1 & -1/2 \end{bmatrix}$$

Note that the columns of $Q_I$ are orthogonal to each other, but their norms are different. However, this was handled via the "r" value used in selecting the de-quantization parameter, as described above. Further, note that in generating $Q_I$ from $Q_D$, $Q_D$ was transposed, with columns one and three multiplied by one-half. Again, however, the QP values already present in the tables D0, D1 and D2 have been adjusted for this in advance, eliminating the need for any additional computational complexity to compensate. Moreover, the only "multiplication" that will need to be done when computing the inverse transforms with such a matrix is by one-half, which is actually performed by a highly-efficient shift right operation. Note that the small amount of noise introduced by such imprecise division has essentially no impact in the rate-distortion performance.

With $Q_I$ defined as above, its maximum gain equals four. Therefore, the two-dimensional inverse transformation process only expands the dynamic range by four bits, allowing for computation in 16-bit arithmetic.

Figure 4:
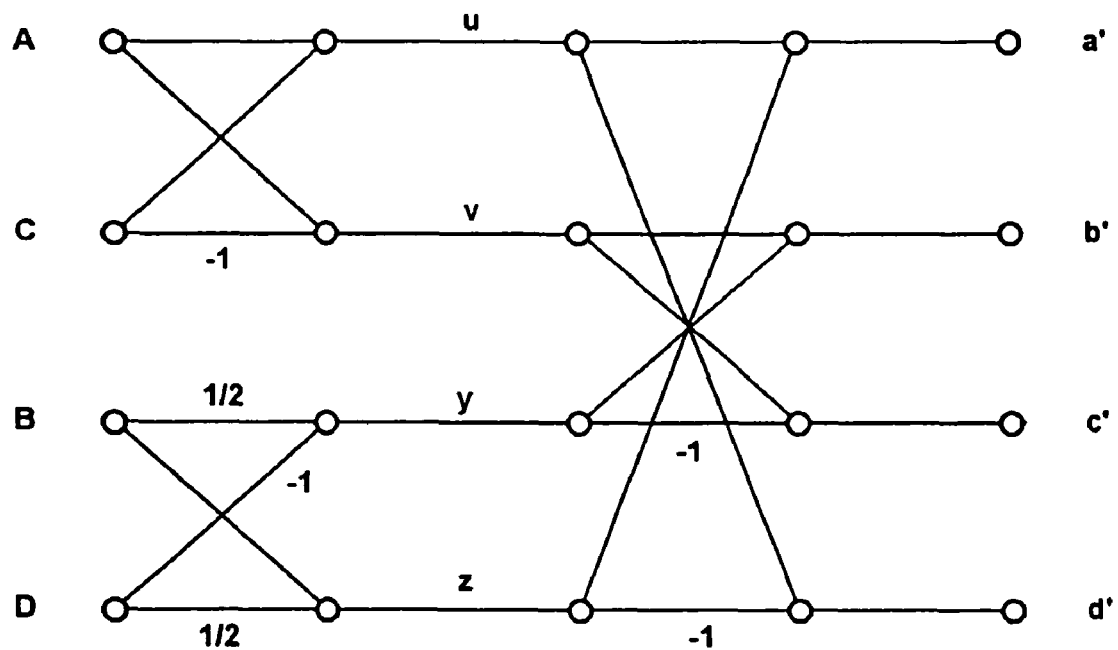
FIG. 4 is a representation of a butterfly structure that represents the improved inverse transformation matrix in accordance with one aspect of the present invention.

The column inverse transform process 236 and row inverse transform process 238 (that operates on the result of the column inverse transform process) represented in FIG. 2 generate the output pixel data 240. To this end, using the above inverse transform matrix and calling [A B C D] a particular row or column to be inverse transformed, the corresponding inverse transformed values [a' b' c' d'] are computed by:

$$u = A+C;$$

$$v = A-C;$$

$$y = (B \gg 1) - D;$$

$$z = (D \gg 1) + B;$$

$$a' = u+z;$$

$$b' = v+y;$$

$$c' = v-y;$$

$$d' = u-z;$$

where u, v, y and z are auxiliary variables and >>1 means shift one bit to the right (equivalent to multiplying by one-half). Similar to encoding, via the butterfly structure represented in FIG. 4, these equations actually reduce to four addition operations and one shift operation per coefficient, all in 16-bit arithmetic. Lastly, the inverse transform process 234 (FIG. 2) scales the reconstructed pixel values by a factor of $2^{-7}$ (performed via a 7-bit shift-right operation).

The reconstructed pixel values after the 7-bit shift have a 9-bit range, so the inverse transform can be computed in 16-bit arithmetic. The de-quantization tables D0, D1 and D2 set forth above are such that the de-quantization equations will not overflow when computed in 16-bit arithmetic. The following tables summarizes some of the computational advantages when using the transform and inverse transform of the present invention relative to those specified in H.26L:

| Transform | Operations per pixel, direct transform | Quantization | De-quantization | Operations per pixel, inverse transform |
|---|---|---|---|---|
| H.26L Specified | 4 additions, 3 multiplications in 32-bit arithmetic | 1 mult. in 32-bit arithmetic | 1 mult. in 32-bit arithmetic | 4 additions, 3 multiplications in 32-bit arithmetic |
| Present Invention | 4 additions, 1 shift, in 16-bit arithmetic | 1 mult. in 32-bit arithmetic | 1 mult. in 16-bit arithmetic | 4 additions, 1 shift, in 16-bit arithmetic |

As can be readily appreciated, such savings are significant, particularly on 16-bit capable processors. For example, in practice, a typical 16-bit PDA processor may see an improvement in decoding of roughly double the speed with the present invention.

Moreover, the transform/inverse transform have been tested with respect to its impact on quality and compression. Results for coding gain (usually defined as an increase in signal-to-noise ratio) show that the use of the transforms of the present invention with test data results in a loss of only about 0.01 dB relative to the H26L transforms, which is negligible, and in fact is likely far smaller than that with actual video signal information, such as pixel prediction errors. Further, overall performance was tested relative to the H.26L specified transforms across each of the thirty-two quantization parameters, resulting in only a plus or minus half percent range of differences, with an average very close to zero, thereby indicating that the transform of the present invention performed as well as the transform specified in H.26L.

As can be seen from the foregoing detailed description, there is provided an improved transform and inverse transform matrices for image or video encoding and decoding, respectively, that significantly reduce computational complexity with respect to other known transforms without adversely impacting compression or quality. Transformation multiplications are eliminated yet correct results are obtained because quantization and de-quantization parameter values compensate for those multiplication factors, except for one performed by a shift operation during the transformation and inverse transformation processes. Because of the values used, transformation operations during encoding, and de-quantization and transformation operations during decoding can be performed in 16-bit arithmetic (for pixel data represented by nine bits or less).

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for decoding video or image information with a computing device that implements a video or image decoder, the method comprising:

receiving quantized transform coefficients at the computing device;

with the computing device, de-quantizing the received quantized transform coefficients into de-quantized transform coefficients, wherein the de-quantizing scales the quantized transform coefficients by scaling factors selected from plural groups of scaling factors, wherein the quantized transform coefficients are logically organized in a block, wherein the inverse transform process is a two-dimensional inverse transform with row and column inverse transforms, the two-dimensional inverse transform having different norms, and wherein selection between the plural groups for the de-quantizing is based on relative coefficient position within the block; and with the computing device, applying an inverse transform process to the de-quantized transform coefficients to generate reconstructed information therefrom.

2. The method of claim 1 wherein each of the plural groups is adapted to adjust for a different norm characterizing a transform process corresponding to the inverse transform process.

3. The method of claim 1 wherein the block is a 4×4 block, and wherein the plural groups consist of first, second, and third groups of scaling factors.

4. The method of claim 3 wherein the first group is selected for four coefficient positions with low scaling, the second group is selected for four coefficient positions with high scaling, and the third group is selected for eight coefficient positions with intermediate scaling.

5. The method of claim 3 wherein the scaling factors in the second and third groups are approximately 1.6 and 1.3, respectively, times greater than corresponding scaling factors in the first group.

6. The method of claim 1 wherein selection of the scaling factors within one of the plural groups is based on a quantization parameter.

7. The method of claim 1 wherein the de-quantizing includes multiplying each of the quantized transform coefficients in the block by one of the scaling factors.

8. The method of claim 1 wherein the reconstructed information is for reconstructed prediction error information for a 4×4 block.

9. The method of claim 1, wherein scaling factors are selected from the plural groups of scaling factors depending on a group index that identifies the selected group and a quantization parameter index selecting the scaling factor within the selected group.

10. The method of claim 9, wherein the block of quantized transform coefficients is a 4×4 block, wherein the plural groups of scaling factors consist of three groups of scaling factors, wherein the two-dimensional inverse transform has three different norms, and wherein each of the three groups of scaling factors is adapted to adjust for a different norm of the three different norms of the two-dimensional inverse transform.

11. The method of claim 9, wherein, for each of the plural groups of scaling factors, scaling with scaling factors of the group approximately doubles for every increment of six in quantization parameter value.

12. A method of coding video or image information in a computing device that implements a video or image encoder, the method comprising:
with the computing device, applying a transform process to the information to produce transform coefficients; and
with the computing device, quantizing the transform coefficients into quantized transform coefficients, wherein the quantizing scales the transform coefficients by scaling factors selected from plural groups of scaling factors, wherein the transform coefficients are logically organized in a block, wherein the transform process is a two-dimensional transform with row and column transforms, the two-dimensional transform having different norms, wherein scaling factors are selected from the plural groups of scaling factors depending on a group index that identifies the selected group and a quantization parameter index selecting the scaling factor within the selected group, and wherein selection between the plural groups for the quantizing is based on relative coefficient position within the block.

13. The method of claim 12 wherein each of the plural groups is adapted to adjust for a different norm characterizing the transform process.

14. The method of claim 12 wherein the block is a 4×4 block, and wherein the plural groups consist of first, second, and third groups of scaling factors.

15. The method of claim 14 wherein the first group is selected for four coefficient positions with low scaling, the second group is selected for four coefficient positions with high scaling, and the third group is selected for eight coefficient positions with intermediate scaling.

16. The method of claim 12 wherein selection of the scaling factors within one of the plural groups is based on a quantization parameter.

17. The method of claim 12 wherein the quantizing includes multiplying each of the transform coefficients in the block by one of the scaling factors.

18. The method of claim 12 wherein the information includes prediction error information for a 4×4 block.

19. A video decoder comprising:
means for de-quantizing quantized transform coefficients into de-quantized transform coefficients, wherein the de-quantizing scales the quantized transform coefficients by scaling factors selected from three groups of scaling factors, wherein the de-quantizing includes multiplying each of the quantized transform coefficients by one of the scaling factors, wherein the quantized transform coefficients are logically organized in a 4×4 block, wherein the inverse transform process is a two-dimensional inverse transform with row and column inverse transforms, the two-dimensional inverse transform having different norms, wherein scaling factors are selected from the plural groups of scaling factors depending on a group index that identifies the selected group and a quantization parameter index selecting the scaling factor within the selected group, and wherein selection between the three groups is based on relative coefficient position within the block; and
means for applying an inverse transform process to the de-quantized transform coefficients.

20. The decoder of claim 19 wherein a first group of the three groups is selected for four coefficient positions with low scaling, a second group of the three groups is selected for four coefficient positions with high scaling, and a third group of the three groups is selected for eight coefficient positions with intermediate scaling.

21. The decoder of claim 20 wherein the scaling factors in the second and third groups are approximately 1.6 and 1.3, respectively, times greater than corresponding scaling factors in the first group.

22. The decoder of claim 19 wherein each of the three groups is adapted to adjust for a different norm characterizing a transform process corresponding to the inverse transform process.

23. The decoder of claim 19 wherein selection of the scaling factors within one of the three groups is based on a quantization parameter.

* * * * *